(12) United States Patent
Kallman et al.

(10) Patent No.: US 7,877,834 B2
(45) Date of Patent: Feb. 1, 2011

(54) SUSPENSION APPARATUS FOR A WORK IMPLEMENT, WORK IMPLEMENT FOR USE WITH SUCH AN APPARATUS, AND VEHICLE PROVIDED WITH THE SUSPENSION APPARATUS

(75) Inventors: Magnus Kallman, Motala (SE); Magnus Hjalmarsson, Motala (SE)

(73) Assignee: Holms Industri AB, Motala (SE)

( * ) Notice: Subject to any disclaimer, the term of this patent is extended or adjusted under 35 U.S.C. 154(b) by 1176 days.

(21) Appl. No.: 10/539,123

(22) PCT Filed: Jan. 12, 2004

(86) PCT No.: PCT/SE2004/000021

§ 371 (c)(1),
(2), (4) Date: Mar. 17, 2006

(87) PCT Pub. No.: WO2004/063477

PCT Pub. Date: Jul. 29, 2004

(65) Prior Publication Data

US 2006/0162103 A1 Jul. 27, 2006

Related U.S. Application Data

(60) Provisional application No. 60/319,864, filed on Jan. 14, 2003.

(30) Foreign Application Priority Data

Jan. 14, 2003 (SE) .................................... 0300101

(51) Int. Cl.
*E01H 1/05* (2006.01)
(52) U.S. Cl. ................. 15/82; 37/231; 37/232; 172/272

(58) Field of Classification Search ............... 15/82; 37/231, 232, 234–236; 172/272, 274, 275
See application file for complete search history.

(56) References Cited

U.S. PATENT DOCUMENTS

| 2,229,229 | A | * | 1/1941 | Wagner ..................... 15/82 |
| 2,229,230 | A | * | 1/1941 | Wagner ..................... 15/82 |
| 2,317,680 | A | * | 4/1943 | Fitzpatrick ................ 37/232 |
| 2,722,066 | A | * | 11/1955 | Wills et al. ............... 172/817 |

(Continued)

FOREIGN PATENT DOCUMENTS

DE 1950865 A 4/1971

(Continued)

*Primary Examiner*—Mark Spisich
(74) *Attorney, Agent, or Firm*—Birch, Stewart, Kolasch & Birch, LLP

(57) ABSTRACT

The invention relates to an apparatus for the suspension of a work implement such as sweeping rollers and ploughs on a vehicle, the apparatus comprising a frame mounted at one end of the vehicle and a carrier (11) fixed to the frame and running essentially transversely to the longitudinal axis of the vehicle. Adjacent to each of its outer ends the carrier can be provided with at least one link (14, 15) having a pivot axis (16, 17) parallel to the longitudinal axis of the carrier at a first end. The ends of the links remote from the carrier are fixedly supported at outer ends of the work implement, the links pivoting independently about each pivot axis (16, 17).

25 Claims, 9 Drawing Sheets

U.S. PATENT DOCUMENTS

| | | | | |
|---|---|---|---|---|
| 3,886,624 A | * | 6/1975 | Landesman et al. | 15/82 |
| 4,127,951 A | * | 12/1978 | Hatch | 37/231 |
| 4,333,250 A | | 6/1982 | Henderson | |
| 4,541,493 A | | 9/1985 | Den Bleyker | |
| 4,962,598 A | * | 10/1990 | Woolhiser et al. | 37/231 |
| 5,018,284 A | * | 5/1991 | Mikami et al. | 37/233 |

FOREIGN PATENT DOCUMENTS

| | | |
|---|---|---|
| DE | 136989 A | 8/1979 |
| EP | 0 216 753 A1 | 4/1987 |
| GB | 2 160 091 A | 12/1985 |
| SE | 513 912 C2 | 11/2000 |

* cited by examiner

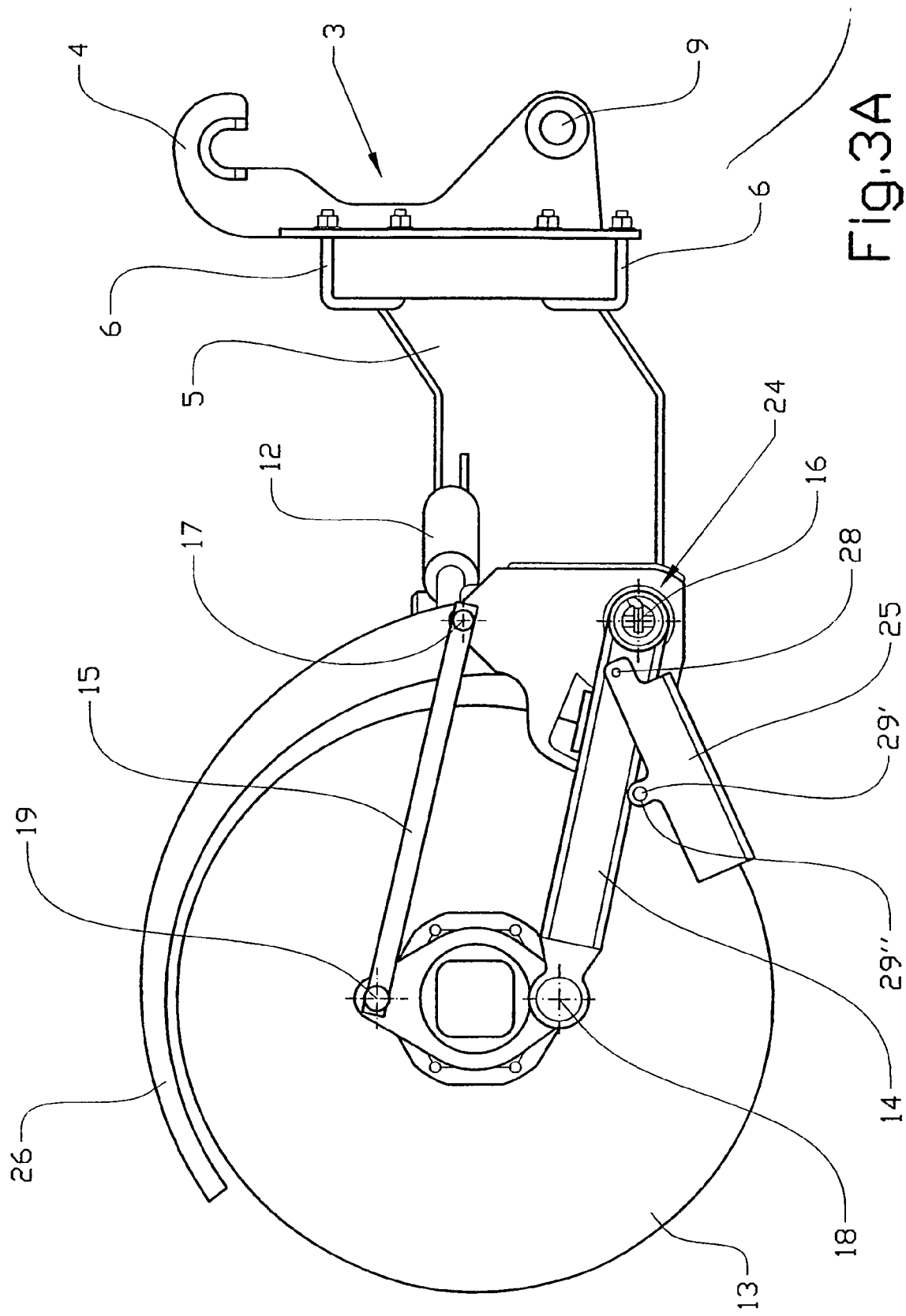

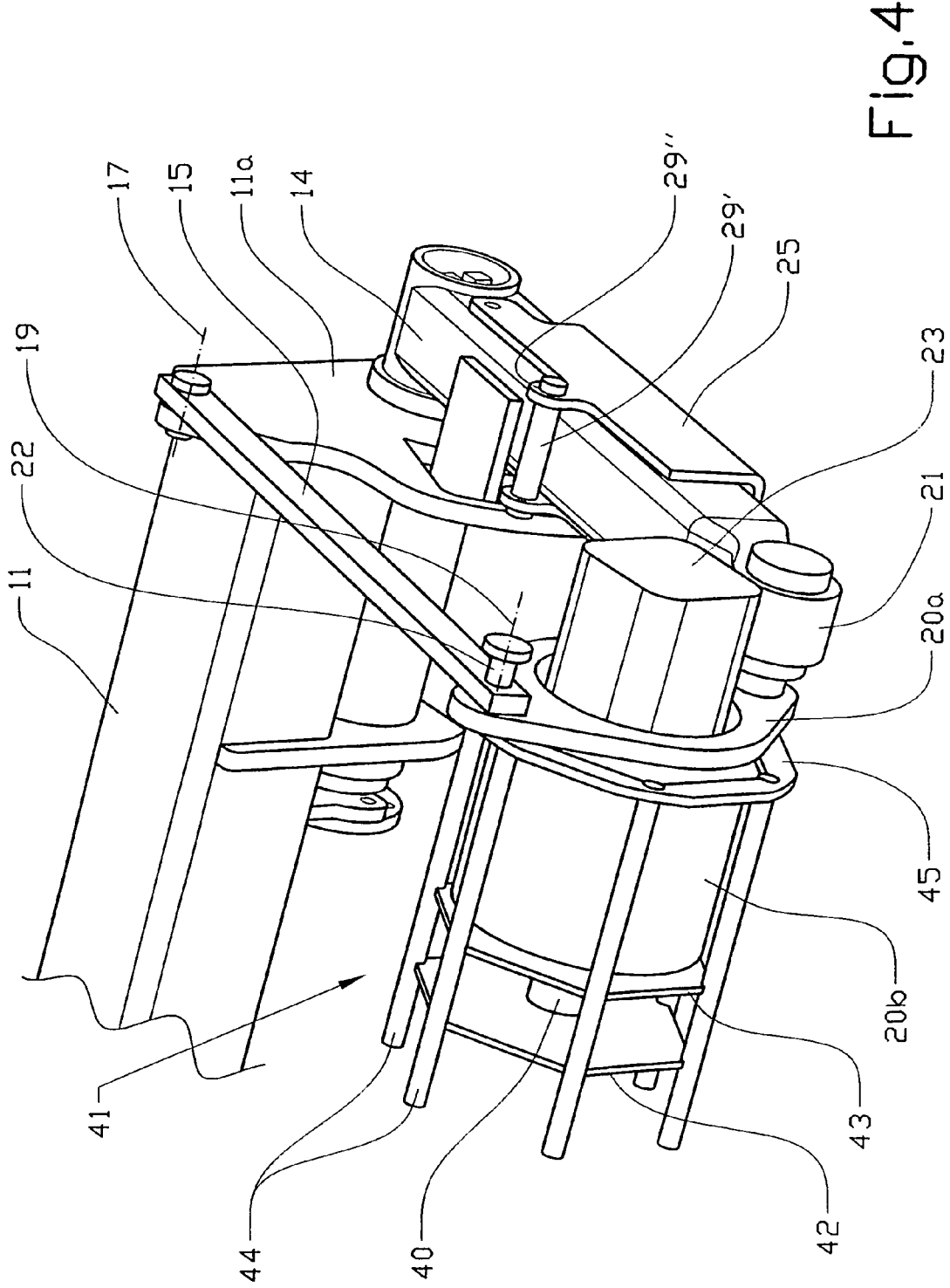

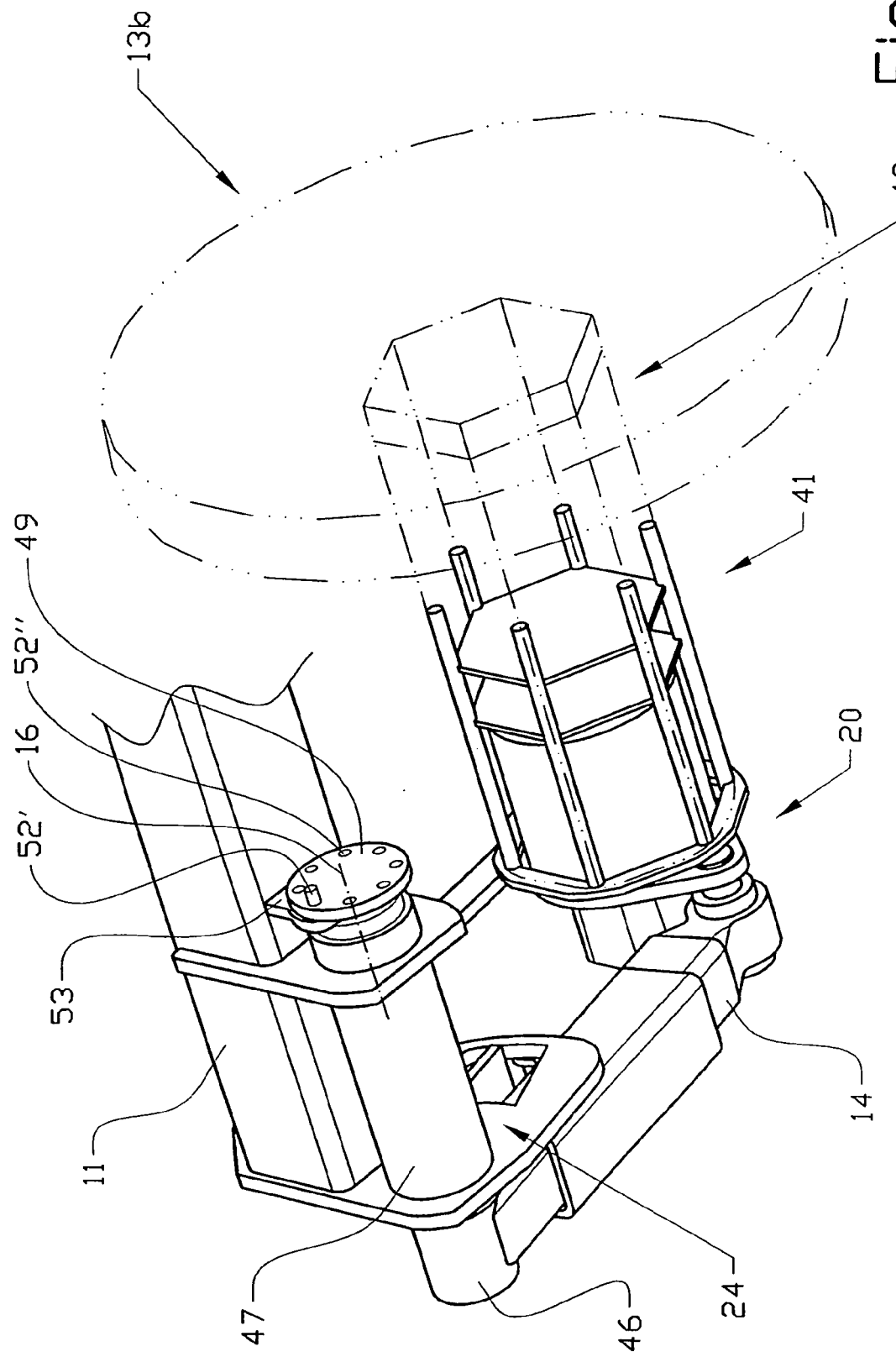

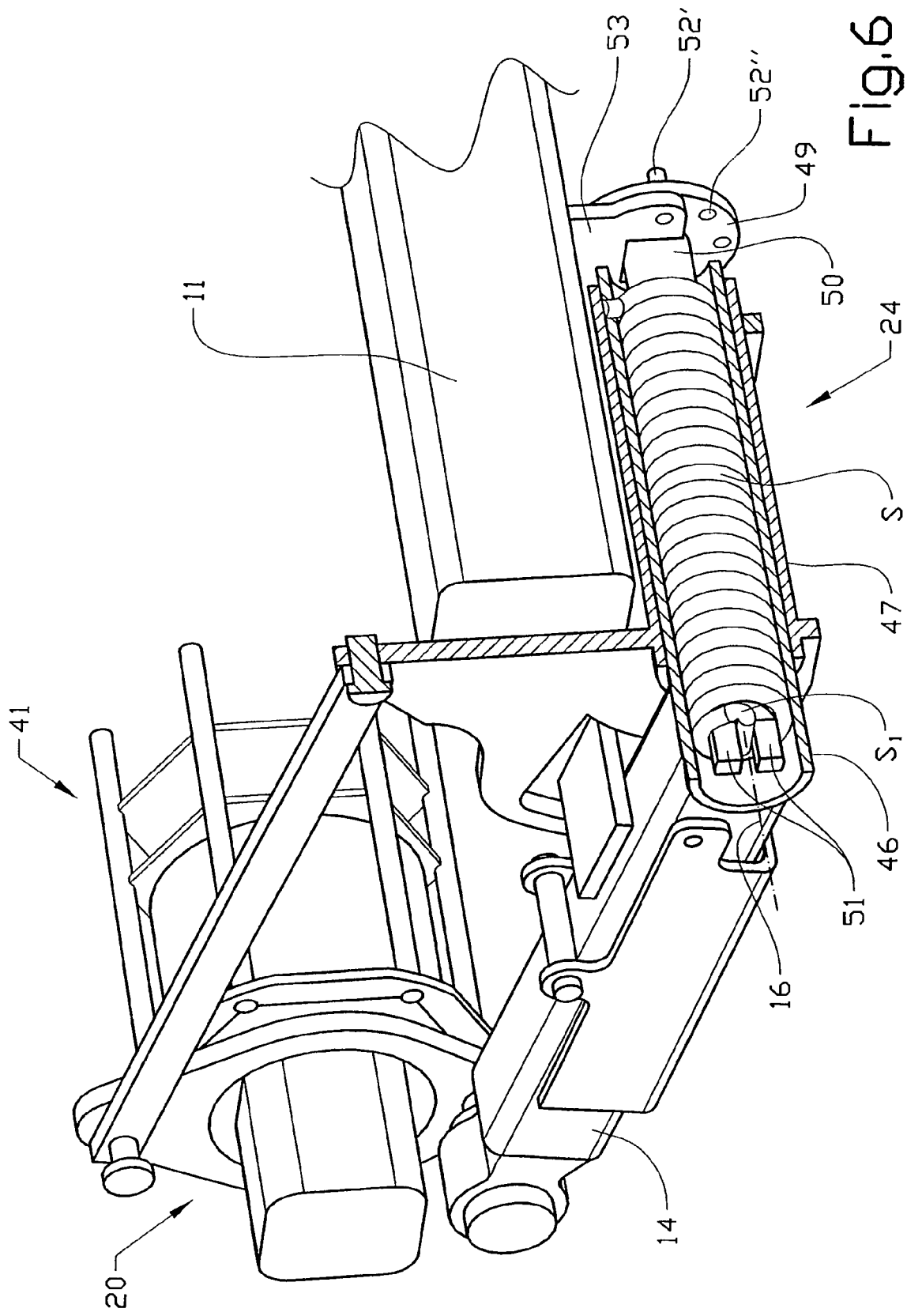

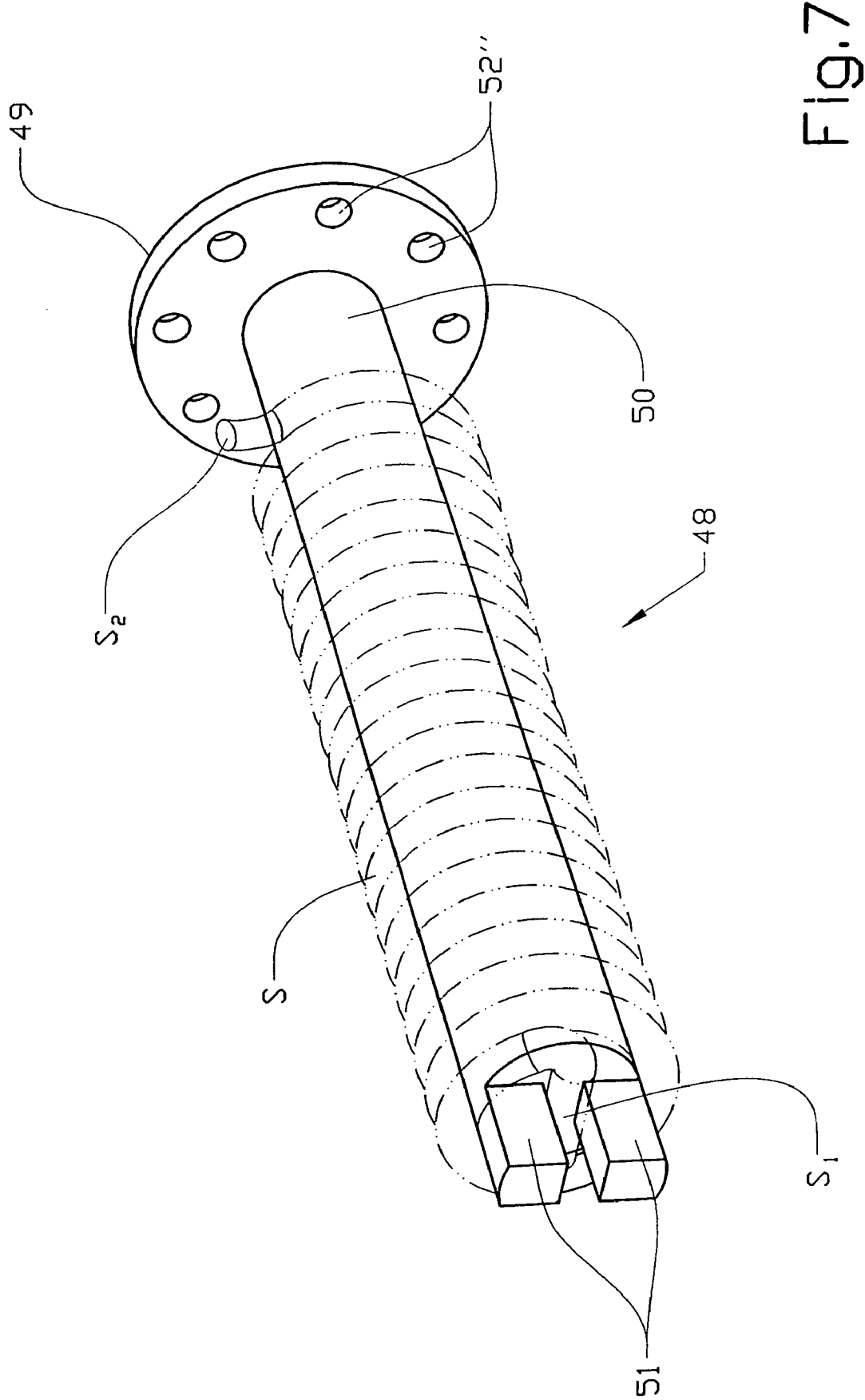

SUSPENSION APPARATUS FOR A WORK IMPLEMENT, WORK IMPLEMENT FOR USE WITH SUCH AN APPARATUS, AND VEHICLE PROVIDED WITH THE SUSPENSION APPARATUS

This application is a national stage of PCT/SE2004/000021, filed Jan. 12, 2004, which claims benefit of U.S. Provisional Application No. 60/319,864, filed Jan. 14, 2003.

TECHNICAL FIELD

The invention relates to an improved apparatus for the suspension of a work implement on a vehicle, the suspension allowing the work implement to maintain a desired surface pressure against an underlying surface over its entire extent.

BACKGROUND ART

The suspension apparatus for work implements such as rotary brushes and ploughs intended to be mounted on a vehicle are already widely known. A common problem with this type of work implement is that it is required to follow an uneven underlying surface whilst maintaining ground clearance or a certain surface pressure. One prerequisite for this is the facility for raising and lowering the work implement vertically whilst at the same time being able to angle it in relation to the suspension apparatus.

U.S. Pat. No. 4,926,517 discloses an apparatus which has a suspension apparatus for a cylindrical sweeping roller. The sweeping roller is fixed into a carrier which also supports a hydraulic motor and a protective hood for the roller. The carrier is fixed to the vehicle by way of a number of linkages and a hydraulic cylinder, which is capable of raising and lowering the sweeping roller in relation to the underlying surface. This means that the operating apparatus must lift a relatively large weight. Furthermore, this apparatus cannot be angled in relation to the carrier in order to follow an uneven surface.

US 2002/0078516 discloses an apparatus having a sweeping roller which can be raised and lowered and can be angled in relation to the holder. In this case, too, an operating apparatus in the from of a hydraulic cylinder must lift a relatively large weight, including the sweeping roller, a pair of drive motors, a protective hood, and a carrier for this combined assembly. In addition to this, the carrier of the sweeping roller is suspended in a holder located above the centre of gravity of the assembly. This means that the suspension is exposed to relatively large torques if the sweeping roller encounters an obstacle or is used with a high surface pressure against the underlying surface. In order to cope with these stresses it may be necessary to design the suspension apparatus accordingly, which can result in a further increase in the sprung weight.

One problem with known solutions, therefore, is that the forces occurring in the use of a work implement can give rise to relatively large torques in the suspension apparatus. These torques can in turn cause increased wear of the moving parts of the suspension and can limit the maximum surface pressure of the work implement against the underlying surface.

A further problem is that work implements which can be both raised and lowered, and independently tilted at each end are often relatively heavy. The fact that the frame, the carrier and the work implement are often mounted in the same unit means that the weight that has to be sprung in order to maintain a certain height or a certain surface pressure is relatively large. This can in turn give rise to increased wear of implements such as rotary cylindrical brushes and ploughs. A heavy unit will also require more force and take longer to avoid edges and larger irregularities in the underlying surface, which may result in more serious damage to or deformation of the work implement.

The apparatus according to the invention solves the problems outlined above.

DISCLOSURE OF INVENTION

The object of the invention is therefore to provide an arrangement in order to produce a simple and robust apparatus for the suspension of a work implement on a vehicle, the suspension, where necessary, being capable of adaptation to different types of work implement. This object is achieved by the characteristic features of Claim 1 in respect of the suspension apparatus, and those of Claims 20 and 25 in respect of a work implement for mounting on the suspension apparatus and a vehicle provided with a suspension apparatus according to Claim 1.

The invention relates to an apparatus for the suspension of a work implement on a vehicle, the apparatus comprising a frame fitted to one end of the vehicle and a carrier fixed to the frame and extending essentially transversely to the longitudinal axis of the vehicle. Adjacent to each of its outer ends, the carrier is provided with at least one link with a pivot axis parallel to the longitudinal axis of the frame. The ends of the links remote from the carrier are fixedly supported at the outer ends of the work implement, the links being capable of swivelling independently about each pivot axis.

According to an alternative embodiment the outer ends of the carrier may be provided with two links with pivot axes parallel to the longitudinal axis of the frame, the links forming a four-bar linkage, such as a parallelogram or the like. Said four-bar linkage is preferably formed by a lower carrier link and an upper torque link.

At least one of the pivoting links is mounted by means of a bearing in a first holder at each of the ends of the work implement, the bearing allowing each first holder to be angled in relation to said link. The bearing is suitably mounted between the carrier link and the first holder. An articulated pivot bearing is a suitable type of bearing for this purpose. If the apparatus also comprises a torque link, this can be fitted with a clearance between link and holder so that forces can be absorbed in the longitudinal direction of the link, whilst the link is at the same time capable of moving in relation to the holder along its pivot axis.

In addition to this the ends of the work implement are each provided with a second holder, supported so that it can slide in relation to said first holder along a common axis. This is intended to permit a certain variation in length between the holders which support each of the ends of the work implement when the links are swivelled relative to one another.

In order to make the work implement height-adjustable or to allow it to assume a so-called floating position with a predetermined surface pressure against an underlying surface, at least one link at each end of the carrier is provided with a torsion spring for adjusting the position of the work implement in relation to the underlying surface. The torsion spring may preferably be adjustable for adjusting the height of the work implement or its ground contact pressure against the underlying surface.

The torsion spring can be fitted to the end or ends of the carrier so that the longitudinal axis of the spring coincides with the pivot axis of the link. Several types of torsion spring are feasible for this purpose, such as an adjustable coil spring, for example, or an adjustable spring of elastic material.

The apparatus can be used for fixing various types of work implement, such as a sweeping roller, which consists of a cylindrical brush capable of rotating about its central axis, or a plough for snow and other material.

According to a preferred embodiment the work implement consists of a sweeping roller. The sweeping roller consists of a cylindrical, rotary brush comprising a hollow core having a non-circular cross section along its longitudinal axis, on which core are fitted a number of brush elements, the central section of which has openings having a cross section intended to interact with the outer periphery of said core. In this case the ends of the links remote from the carrier are fixedly supported in the first holder at each end of the brush adjacent to the central axis of the rotary brush. The links may suitably be fixedly supported in the first holder on opposite sides of the central axis of the brush. The pivot axes of the links on the carrier and the first holder may preferably be located in an essentially vertical plane through said central axis.

The rotary brush is driven by at least one drive motor fixed to the first holder. The motor and the first holder may suitably be mounted in such a way that they project at least partially into the hollow core. Certain heavier applications may require the brush to be provided with a motor at each end. The size and type of motor are preferably determined as a function of the field of application and loading of the apparatus. According to a preferred embodiment the drive motor is a hydraulic motor, although other types such as electric motors can also be used.

As stated above, a certain variation in length may be required between the holders supporting the respective ends of the brush when the links are swivelled relative to one another, so that the central axis of the sweeping roller is angled in relation to said first holder. For this reason the output shaft of the motor is fixed to the said second holder, which is fitted so that it can slide but not rotate in relation to the continuous hollow core in the brush. The rotationally fixed mounting can be achieved by designing the core of the brush with a non-circular cross section. One example of this is a polygonal cross section, with anything from three to ten sides, for instance. According to a preferred embodiment the core of the brush has a hexagonal cross section along its inner and outer periphery.

One advantage of the suspension apparatus according to the invention is that the fixing of the implement to the carrier, either by means of a single link, parallel links or some form of four-bar linkage, and the fixing of the carrier to a frame in front of or behind the vehicle, can be located broadly speaking in the same horizontal plane. This means that relatively large forces can be transmitted by the suspension apparatus without giving rise to any larger torques in the construction.

A further advantage is that the work implement itself can be both raised and lowered and independently tilted at either end. Fixing both the frame and the carrier to the vehicle minimizes the weight that has to be sprung when a certain height or a certain surface pressure must be maintained. Since only the actual implement oscillates in order to follow the underlying surface, only the sweeping roller or the plough itself needs to be moved. In the case of the former additional equipment such as a protective hood, collecting vessel and water tank can also be mounted directly on the frame or the transverse carrier.

BRIEF DESCRIPTION OF DRAWINGS

The invention will be described in more detail below with reference to examples of embodiment shown in the drawings attached, in which:

FIG. 3A shows a side view of the sweeping roller comprising a first linkage;

FIG. 4 shows a perspective view of a carrier linkage and a drive unit, viewed obliquely from the front;

FIG. 5 shows a perspective view of a carrier linkage and a torsion spring unit, viewed obliquely from behind;

FIG. 6 shows a perspective view of a carrier linkage and a cross-section through the torsion spring unit;

FIG. 7 shows a perspective view of a holder for an adjustable torsion spring.

MODES FOR CARRYING OUT THE INVENTION

Figure 1:
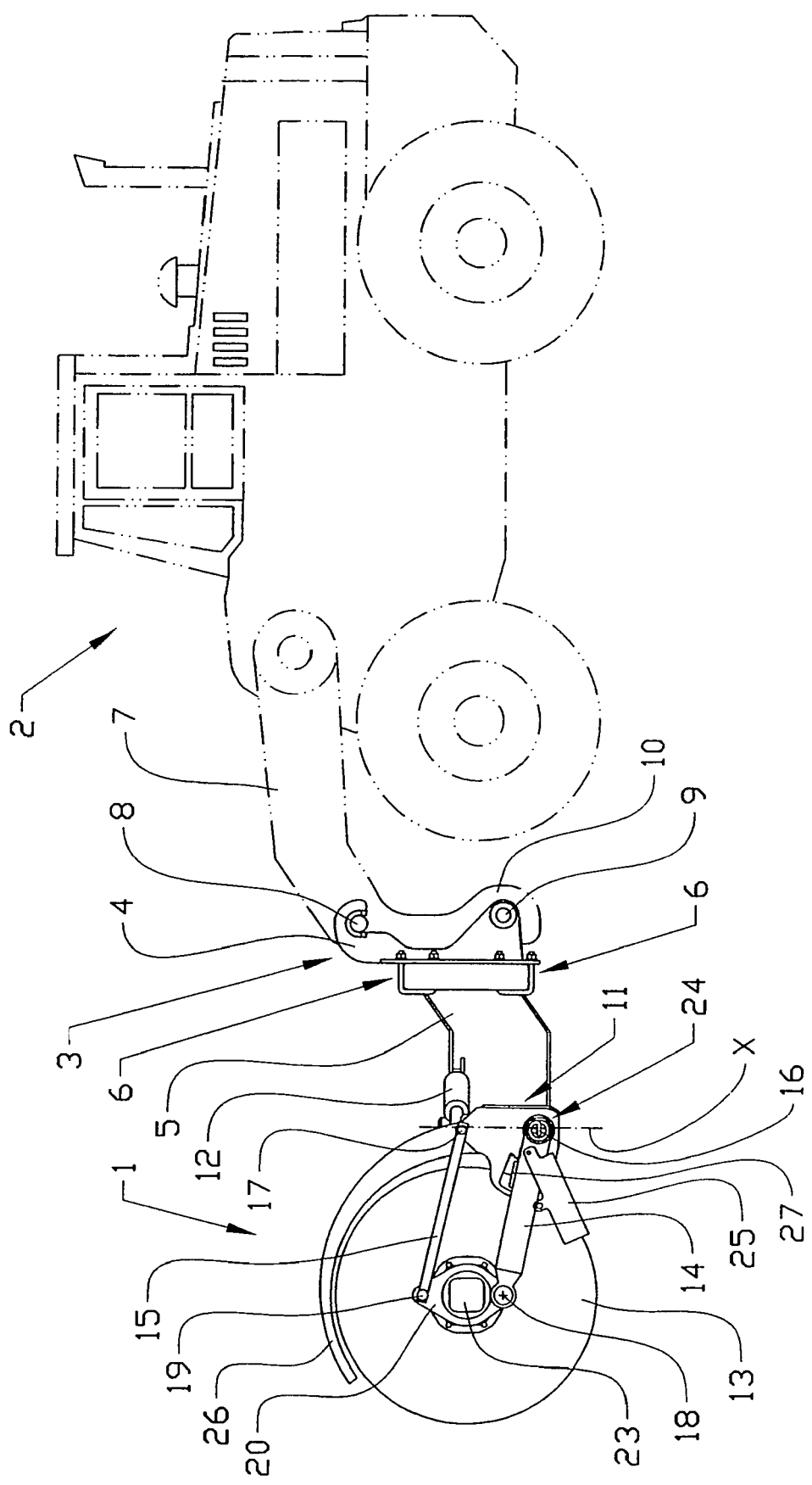
FIG. 1 shows a sweeping roller according to the invention fixed to a vehicle.
Figure 2:
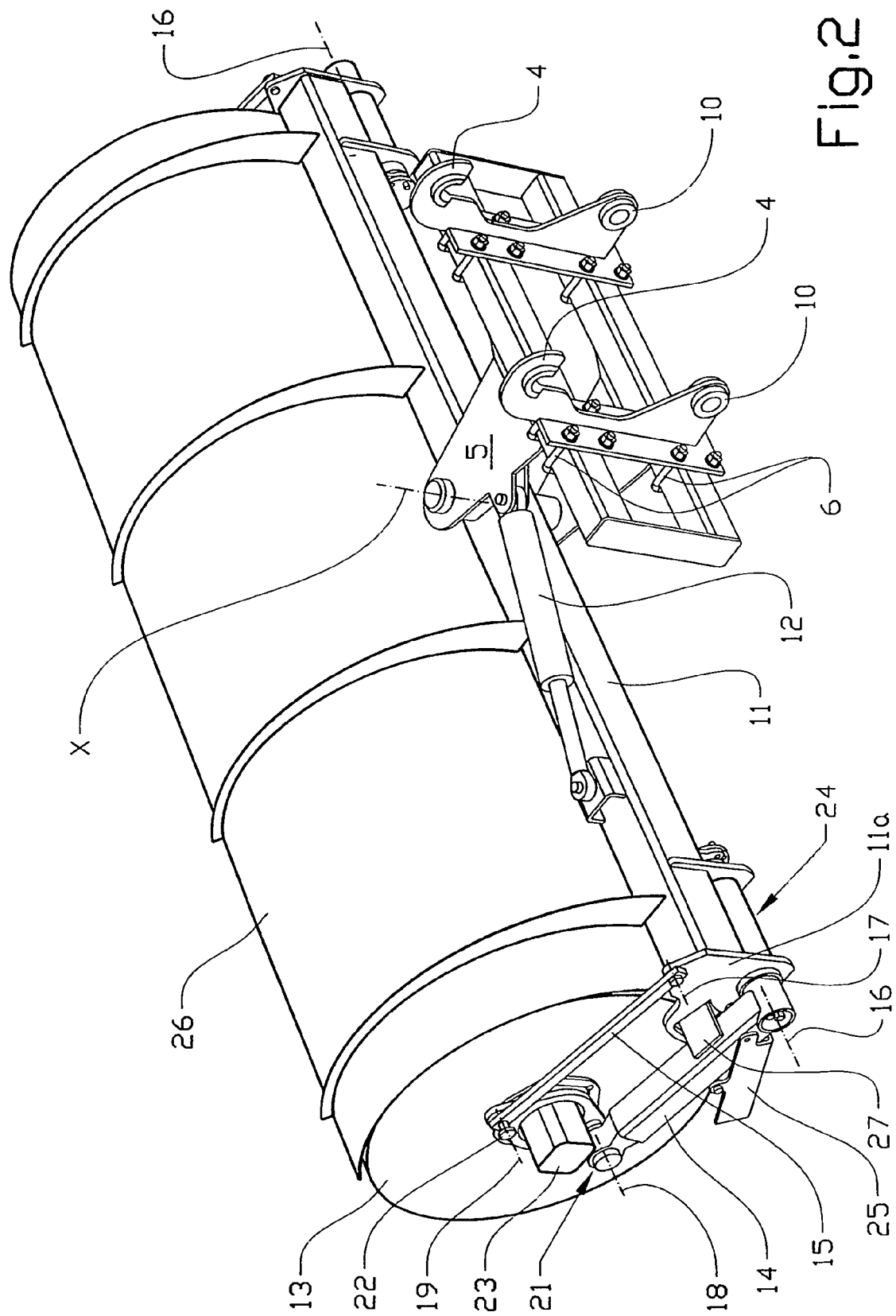
FIG. 2 shows a perspective view of the sweeping roller and its fixing.

FIG. 1 illustrates, in schematic form, a sweeping roller 1 fixed to a traction vehicle 2, whilst FIG. 2 shows only the sweeping roller and its fixing apparatus. The sweeping roller is provided with a fixing apparatus 3 of standard type, which comprises a pair of boltable attachment hooks 4. These hooks 4 are fixed to a tool carrier 5 by means of shackles 6, which allow the hooks 4 to be easily replaced for adaptation to the carriers 7 of the vehicle in question. The hooks 4 are hooked on to holders 8 on an upper part of the vehicle's carriers 7, a first support 10 on the lower part of the fixing apparatus 3 interacting with a second support 10 on a lower part of the vehicle's carriers 7. The tool carrier 5 is provided with a transverse beam 11 (see FIG. 2), which in a neutral position is located essentially at right angles to the longitudinal axis of the vehicle. The transverse beam 11 can be angled in relation to the tool carrier 5 about a vertical pivot X axis (see FIG. 2). The angular adjustment of the beam 11 is achieved by means of a hydraulic cylinder 12.

The transverse beam 11 supports a cylindrical rotary brush 13 by way of a first carrier link 14 and a second torque link 15, the links forming a four-bar linkage in the form of a parallelogram. The first and second links 14 and 15 are supported about a first and a second pivot axis 16 and 17 respectively at the outer ends of the transverse beam 11. The first pivot axis 16 is situated essentially vertically below the second pivot axis 17, the two axes being parallel to the main longitudinal axis of the transverse beam 11. The ends of the links 14 and 15 remote from the beam 11 are fixedly supported about a third and a fourth pivot axis 18 and 19 in a first holder 20 at the outer end of the brush, the links on either side of the ends of the brush pivoting independently about each of the pivot axes. The third pivot axis 18 is situated essentially vertically below the fourth pivot axis 19, in the same way as for the said first and second pivot axes 16, 17. Said third pivot axis 18 is supported in an articulated pivot bearing 21 relative to the holder 20, whilst said fourth pivot axis 19 is supported with a relatively large clearance about an axis 22 of the holder 20. This arrangement allows the holder 20 to be angled in relation to the links 14, 15, which in turn permits an angling of the longitudinal axis of the rotary brush, so that the brush can follow the lateral inclination of the underlying surface. The brush 13 is preferably driven by a directly acting hydraulic motor 23, mounted in the holder 20 between the pivot axes 18, 19 of the links 14, 15. The brush is preferably provided with a motor on either side.

With the vehicle stationed on a level, horizontal surface, the fixing apparatus 3, the tool carrier 5 and the transverse beam 11 are situated in approximately the same plane. In such an unloaded state the pivot axes 18, 19 of the links 14, 15 are essentially parallel to the longitudinal axis of the transverse beam 11. The forces occurring when the sweeping roller is in operation can thereby be transmitted straight backwards to the vehicle tool carrier via the links. At the same time the links 14, 15 can be angled somewhat upwards away from the vehicle in order to allow the brush to spring out of the way if it strikes an edge or similar obstacle.

The carrier link 14 is provided with a torsion spring 24, which is designed to balance the combined weight of the brush, the links and the motors. This spring preferably consists of a coil spring, which is adjustable in order to permit adjustment of the surface pressure against the underlying surface or to compensate for wear. The torsion spring 24 will be described in more detail below. In addition to this, the carrier link 14 is provided with a folding support 25, against which the sweeping roller can be rested when it is not mounted on a vehicle. This support, too, will be described in more detail below.

As will be seen from FIGS. 1 and 2, the transverse beam 11 also comprises an attachment for a protective hood 26 fitted over the rotary brush. The beam is also provided with stops 27 at its outer ends. These stops 27 are located above the carrier link 14 in order to prevent the link coming into contact with the protective hood 26 if the brush 13 is forced upwards by an edge or an obstacle. The stop may be designed to be resilient so that the carrier link can be braked if it is exposed to external action.

FIG. 3A shows a side view of a sweeping roller according to the invention, of the same type as was described in connection with FIGS. 1 and 2. This figure shows how the pivoting support 25 is fastened around a pivot axis 28 on the carrier link 14. The support 25 is here shown in its deployed position, it being possible to insert a transverse bolt 29' through a recess 29" on the upper surface of the support. The under-surfaces of the fixing apparatus 3 and the support 25 are intended to rest against the underlying surface and the carrier link 14 rests against the transverse bolt in the support 25. This prevents the brush 13 resting directly on the underlying surface when the sweeping roller is not in use. By removing the transverse bolt 29' the support can be folded into contact with the carrier link 14. In this position the bolt is brought back through the recess 29", which in the raised position is situated above the upper surface of the link 14, in order to lock the support in position.

Figure 3B:
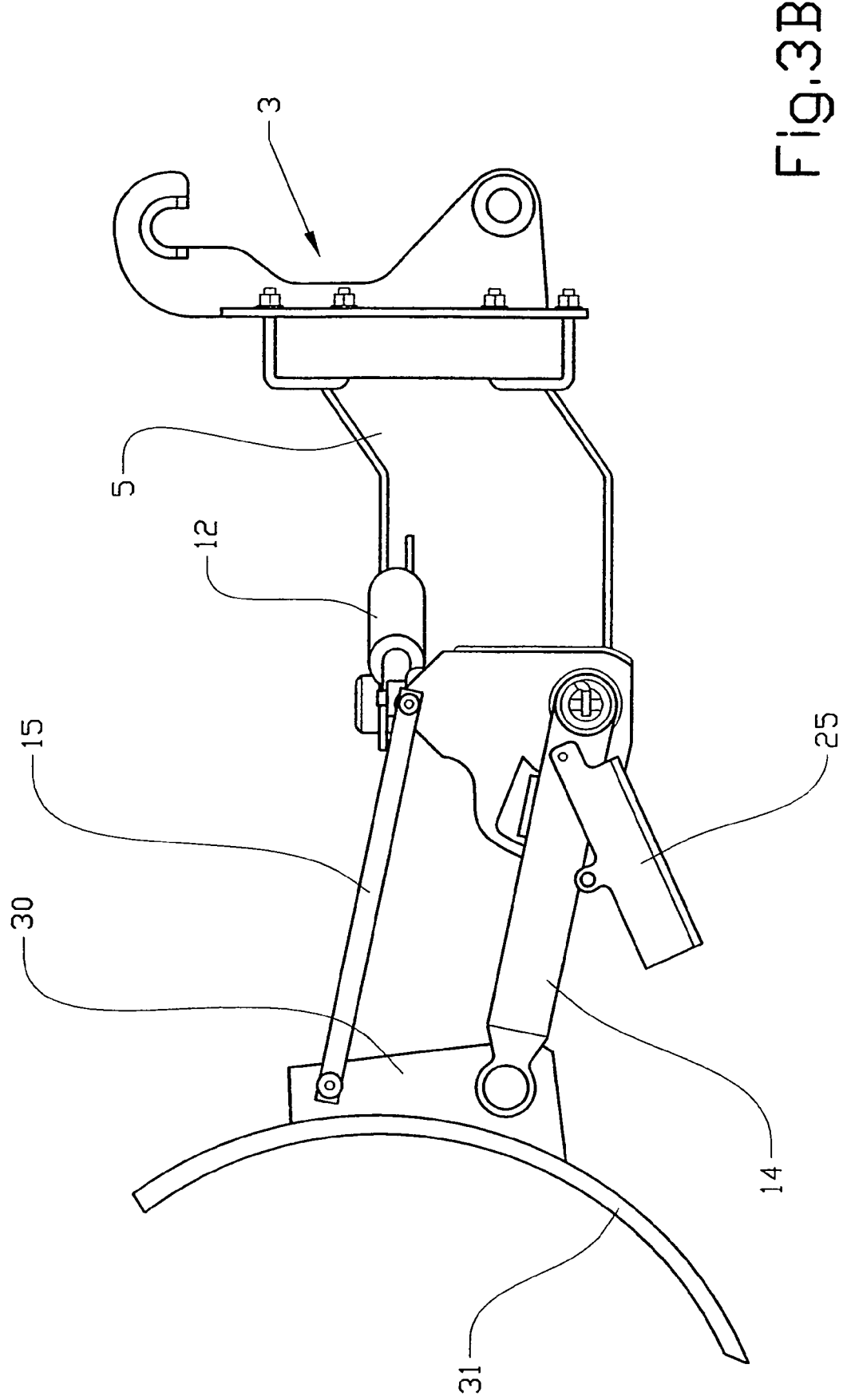
FIG. 3B shows a side view of a plough comprising said first linkage.

FIG. 3B shows a side view of a plough according to the invention. The plough is supported by the same first and second links 14, 15, forming a four-bar linkage, which has largely been described above. The links, however, are fixed to an alternative holder 30, which constitutes an attachment for a plough blade 31. The links 14, 15 are fixed to the holder 30 in the same way as described above in connection with FIGS. 1 and 2, with the difference that the links are not parallel. The plough blade 31 can be given a predetermined surface pressure against the underling surface, and angled laterally in the same way as the brush roller according to FIGS. 1, 2 and 3A.

Figure 3C:
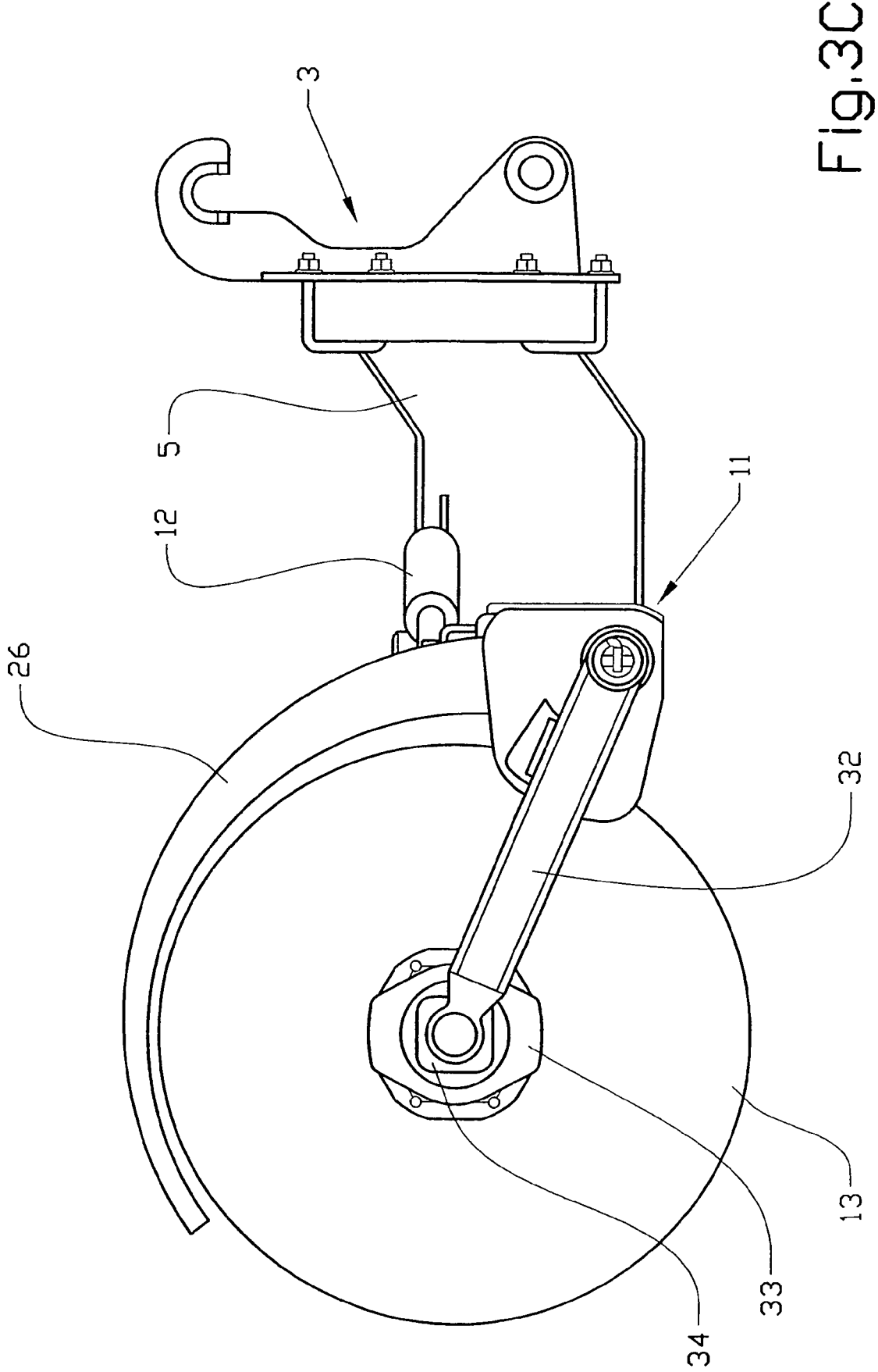
FIG. 3C shows a side view of the sweeping roller comprising a second linkage.

FIG. 3C shows a side view of an alternative sweeping roller according to the invention, which is of a type similar to that described in connection with FIGS. 1, 2 and 3A. This embodiment, however, is only provided with a single carrier link 32, mounted between the outer ends of the transverse beam 11 and a holder 33 on the central axis for the outer ends of the brush. The outer end of the carrier axis can be fixed to the holder by means of an articulated pivot bearing in the same way as described above. This arrangement, too, allows the holder 33 to be angled in relation to the link 32, as described above, which in turn allows the longitudinal axis of the rotary brush to be angled so that the brush can follow the lateral inclination of the underlying surface. The brush is preferably driven by a single directly acting hydraulic motor 34, fixed so that it cannot rotate in relation to the link 32, for driving one of the holders 33 at the outer ends of the brush, the opposite, non-driven end of the brush merely being supported in a pivot bearing so that it can rotate in relation to the holder 33.

FIG. 4 shows a perspective view of a carrier linkage and a drive unit. The brush has been removed in order to reveal its driver. The figure shows the transverse beam 11 and the end surface 11 a thereof, on which the carrier link 14 and the torque link 15 are fixedly supported. These links 14, 15 are fixedly supported in an outer part 20a of the holder 20, which outer part consists of a plate having a central recess for the drive motor 23 and fixing points for the links on diametrically opposite sides of the recess. The carrier link 14 is fixed to the plate by an articulated pivot bearing, which allows the plate to be angled in relation to the main pivot axis of the articulated pivot bearing. In order to permit such angling, the torque link 15 is fixed with some play about an axis 22 on the plate. An angling of the outer part 20a of the holder in a plane through the pivot axes of the links will cause the torque link 15 to slide along its pivot axis 19 alongside the axis 22.

Such an angling of the first holder 20 leads to an adjustment of the distance between the ends of the carrier links on either side of the brush. In this case the drive motor 23 is mounted in an inner part 20b of the first holder, which inner part 20b consists of a cylindrical sleeve, which is arranged some distance into the hollow core of the brush. The output shaft (not shown) of the drive motor 23 projects through an end surface of said cylindrical sleeve to be fixed to a drive sleeve 40 in a second holder 41. This second holder 41 is located inside the first holder 20 in the core 13a of the brush. The location of the core in relation to the second holder 41, and a brush element 13b for fitting around the core is indicated by dashed lines in FIG. 5. The drive sleeve 40 is provided with a hexagonal plate 42, 43 at each end, at right angles to the axis of the drive motor. At all corners the plates 42, 43 are joined together by circular rods 44, which run parallel to the axis of the drive motor back to the outer end of the core. The circular rods 44 are fixed to a further, annular plate 45, which is placed around the inner part 20b of the first holder 20. The six circular rods 44 are here intended to interact with corresponding inner corners in the hexagonal core 13a of the brush, partly in order to rotate the brush and partly in order to permit displacement of the core during angling of the first holder. The annular plate 45 bears entirely or partially against the end surface of the brush and the core 13a to form a stop preventing the end surface of the core coming into contact with the first holder 20.

FIG. 4 also shows how the support 25 is located in relation to the carrier link 14 in its inactive, raised position. The bolt 29' intended to be inserted through the recess 29" in order to hold the support 25 in place is not shown.

The figure also shows the location of the stop 27, which is intended to limit the upward movement of the carrier link 14 if the brush strikes an obstacle.

FIG. 5 shows a perspective view of a carrier linkage and a torsion spring unit 24. The torsion spring is designed to balance the combined weight of the brush, the links and the motors. This spring preferably consists of a coil spring (see FIG. 6), which is adjustable and allows the surface pressure against the underlying surface or the height of the work implement to be adjusted, or serves to compensate for wear.

The torsion spring unit 24 is fitted along the ends of the transverse beam 11 so that the longitudinal axis of the torsion spring coincides with the pivot axis 16 of the carrier link 14. The carrier link 14 comprises a cylindrical sleeve 46, which is rotatable about the pivot axis 16 and runs through a corresponding cylindrical holder 47, fixed to the beam 11. A holder 48 for the torsion spring is located in the cylindrical sleeve 46 of the link 14, the torsion spring being fixed between this sleeve 46 and its holder 48. The holder 48 comprises a lock plate 49 at a first end, a cylindrical section 50 around which a coil spring is located. The lock plate 49 is provided with through-holes 52" along its outer periphery. In the present example a lock plate is shown having eight equally spaced holes around its periphery, but the number of holes may vary depending on factors such as the spring constant, spring length and the desired adjustment accuracy for the torque holding up the work implement.

A lock pin 52' can be inserted through one of these holes 52" and interacts with a corresponding recess in an attachment 53 to the beam 11, it being possible to lock the holder to prevent rotation in relation to the beam. The torsion spring is adjusted by releasing a lock plate 49, turning it through an appropriate distance and locking it in its new position.

FIG. 6 shows a perspective view of a carrier linkage according to FIG. 5 with a cross section through the torsion spring unit 24. The torsion spring, in this case a coil spring, is located in the cylindrical sleeve 46 of the link 14 and is fixed between this and its holder. The holder comprises a lock plate 49 at a first end, a cylindrical section 50, around which a coil spring S is located, and a pair of projections 51 which lock one end $S_1$ of the coil spring to prevent rotation in relation to the holder. The other end $S_2$ of the coil spring interacts with a recess in the inner periphery of the cylindrical sleeve 46. When the lock plate 49, viewed from the front (cf. FIG. 5), is rotated anticlockwise, the coil spring will transmit a torque to the sleeve 46 and the link 14, which causes the work implement holder 41 to be lifted upwards.

The torsion spring in this case consists of a spring steel coil spring. Other types of torsion spring, such as spring elements of composite material or composite elements of elastomer material can also be used without departing from the scope of the invention.

FIG. 7 shows a holder 48 for such a torsion spring, the holder comprising said lock plate 49 at a first end, a cylindrical section 50 around which a coil spring is located, and a pair of parallel, axial projections 51 for interaction with one end of the coil spring. The lock plate 49 is provided with through holes 52" parallel to its outer periphery. A lock pin 52' can be inserted through one of these holes 52" and interacts with a corresponding recess in an attachment 53 to the beam 11, it being possible to lock the holder to prevent rotation in relation to the beam. The torsion spring is adjusted by releasing a lock plate 49, turning it through an appropriate distance and locking it in its new position. The projections 51 of the holder 48 then turn the spring about the pivot axis 16 of the carrier link, the torsion spring transmitting the tensioned force to the link 14 by way of the cylindrical sleeve 46.

The invention must not be regarded as being limited to the examples of embodiments described above, a number of further variants and modifications being feasible within the scope of the following patent claims.

The invention claimed is:

1. Apparatus for the suspension of a work implement on a vehicle, the apparatus comprising:
   a frame fixedly mounted at one end of the vehicle; a carrier fixed to the frame and having a longitudinal axis extending essentially transversely to a longitudinal axis of the vehicle,
   wherein the carrier adjacent to each of its outer ends is provided with a first link having a first end and a second end,
      the first end of each of the first links having a first pivot axis parallel to a longitudinal axis of the carrier for pivotably attaching the first links to the carrier, and
      the second end of each of the first links remote from the carrier being fixedly supported at outer ends of the work implement,
   wherein each of the first links is independently pivotable about the corresponding first pivot axis,
   wherein each of the first links is mounted, respectively, by means of a bearing in a first holder at each of the ends of the work implement, said bearing allowing each first holder to be angled in relation to said corresponding first link,
   wherein when one of the first links pivots independently about the first pivot axis, the work implement is pivotable to positions in which a longitudinal axis of the work implement and the longitudinal axis of the carrier are not parallel to each other.

2. The apparatus according to claim 1, wherein each of the first links includes a lower carrier link and an upper torque link, and
   wherein each of the lower carrier link and the upper torque link has a second pivot axis parallel to the longitudinal axis of the carrier, the lower carrier link and the upper torque link forming a four-bar linkage.

3. The apparatus according to claim 2, wherein said four-bar linkage shaped substantially as a parallelogram.

4. The apparatus according to claim 1, wherein each of the ends of the work implement is supported so as to be slidable in an axial direction of the work implement in relation to said first holder.

5. The apparatus according to claim 4, wherein the first link at each end of the carrier is provided with a torsion spring for positioning the work implement in relation to an underlying surface.

6. The apparatus according to claim 5, wherein the torsion spring is adjustable for adjustment of a ground pressure of the work implement against an underlying surface.

7. The apparatus according to claim 6, wherein a longitudinal axis of the torsion spring coincides with a horizontal pivot axis of the first links.

8. The apparatus according to claim 7, wherein the torsion spring includes an adjustable coil spring.

9. The apparatus according to claim 7, wherein the torsion spring includes an adjustable spring of an elastic material.

10. The apparatus according to claim 4, wherein the work implement is a plough, the respective ends of which are slidably attached to said first holders to allow the holders to pivot with respect to the first links.

11. The apparatus according to claim 4, wherein the work implement is a cylindrical brush capable of rotating about its central axis, the respective ends of which are slidably attached to said first holders to allow the holders to pivot with respect to the first links.

12. The apparatus according to claim 11, wherein each of the first links includes a lower carrier link and an upper torque link, and wherein each of the lower carrier link and the upper torque link has an end remote from the carrier that is fixedly supported in the first holder at each end of the brush adjacent to the central axis of the brush.

13. The apparatus according to claim 12, wherein the ends of the lower carrier link and the upper torque link remote from the carrier are fixedly supported in the first holder on opposite sides of the central axis of the brush.

14. The apparatus according to claim 12, wherein the brush can be made to rotate via at least one drive motor fixed to the first holder, while the central axis of the brush is angled relative to each of the lower carrier link and the upper torque link.

15. The apparatus according to claim 14, wherein an output shaft of the motor is fixed to a second holder, which is mounted so that it can slide but is rotationally fixed in relation to a continuous hollow core in the brush.

16. The apparatus according to claim 15, wherein the core of the brush is formed with a non-circular cross section.

17. The apparatus according to claim 16, wherein the core of the brush has a hexagonal cross section.

18. The apparatus according to claim 14, wherein the drive motor is a hydraulic motor.

19. A vehicle provided with an apparatus for the suspension of the work implement according to claim 1.

20. The apparatus according to claim 1, wherein the apparatus further comprises a drive motor disposed remotely from the carrier at the outer end of the work implement.

21. The apparatus according to claim 1, wherein the work implement is pivotable between a position in which the longitudinal axis of the work implement and the longitudinal axis of the carrier are parallel to each other, to a plurality of other positions in which the longitudinal axis of the work implement and the longitudinal axis of the carrier are not parallel to each other.

22. The apparatus according to claim 1, wherein each of the ends of the work implement is designed to be supported so that it can slide in an axial direction in relation to the corresponding first link.

23. Apparatus for the suspension of a work implement on a vehicle, the apparatus comprising:
    a frame mounted at one end of the vehicle; and a carrier fixed to the frame and having a longitudinal axis extending essentially perpendicular to a longitudinal axis of the vehicle,
    wherein the carrier adjacent to each of its outer ends is provided with a first link having a first end and a second end,
        the first end of each of the first links having a first pivot axis parallel to a longitudinal axis of the carrier at a first end, and
        the second end of each of the first links remote from the carrier being fixedly supported at outer ends of the work implement,
    wherein each of the ends of the work implement is supported so as to be slidable in an axial direction of the work implement relative to the corresponding first link, further comprising:
    a holder provided at opposite ends of the work implement, the two holders being independently slideable with respect to each other along a longitudinal axis of the work implement,
    wherein the second end of each of the first links is pivotably connected to the corresponding holder at a point radially outward with respect to the longitudinal axis of the work implement.

24. The apparatus according to claim 23, further comprising a bearing provided at opposite ends of the work implement, the two bearings being independently rotatable with respect to each other about a longitudinal axis of the work implement,
    wherein the holder on each end of the work implement is mounted on the corresponding bearing, the bearing at one end of the work implement being independently pivotable with respect to the bearing at the opposite end of the work implement,
    wherein the holder and first link at the one end of the work implement are able to pivot independently with respect to the holder and first link at the opposite end of the work implement.

25. The apparatus according to claim 23, wherein each of the ends of the work implement is supported so that it is slidable in an axial direction in relation to the first link and the carrier.

* * * * *